3,155,197
MULTIPLE VEHICLE BRAKING APPARATUS
Arthur L. Lee and Arthur B. Coval, Columbus, Ohio, assignors to Consolidation Coal Company, Pittsburgh, Pa., a corporation of Pennsylvania
Filed Oct. 24, 1962, Ser. No. 233,206
16 Claims. (Cl. 188—86)

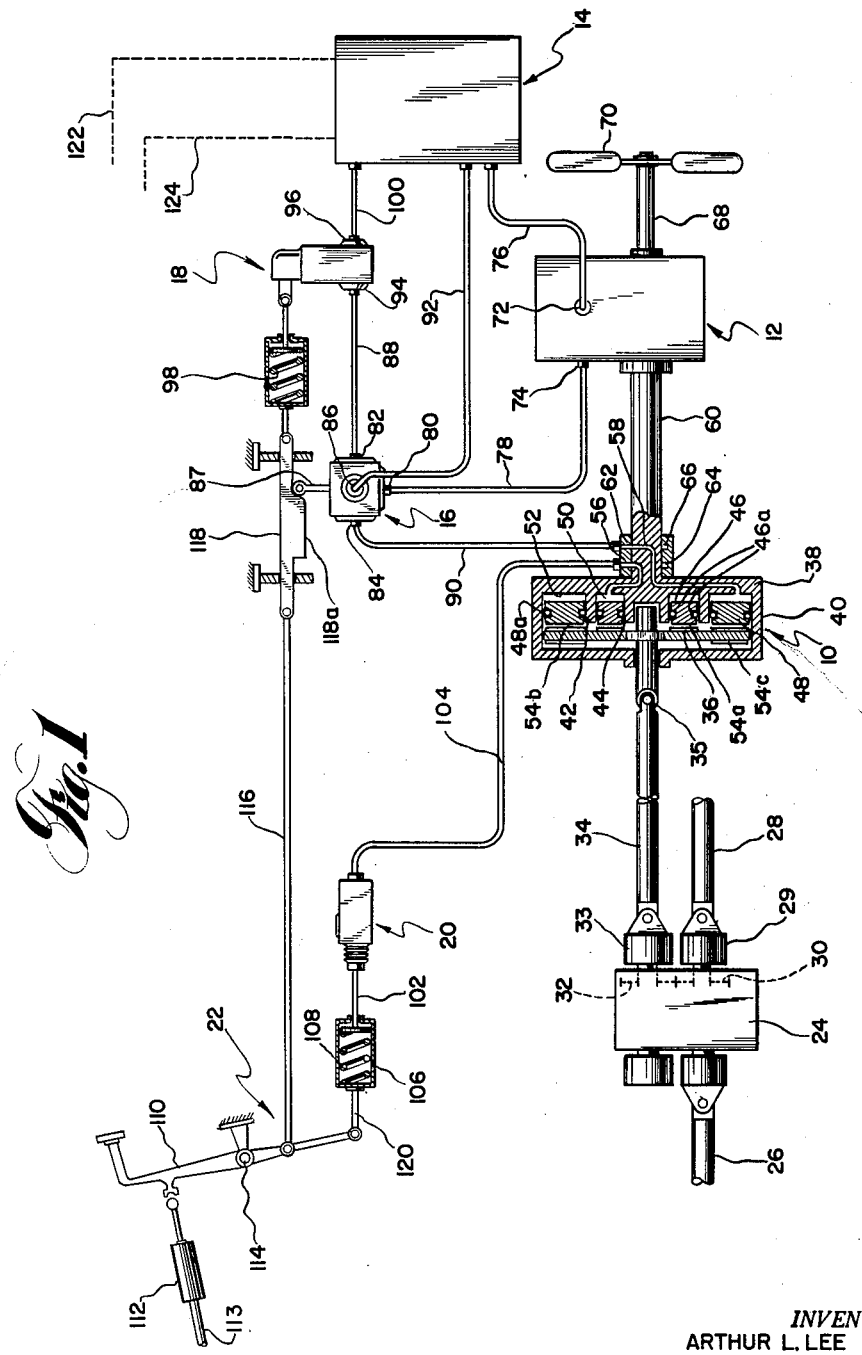

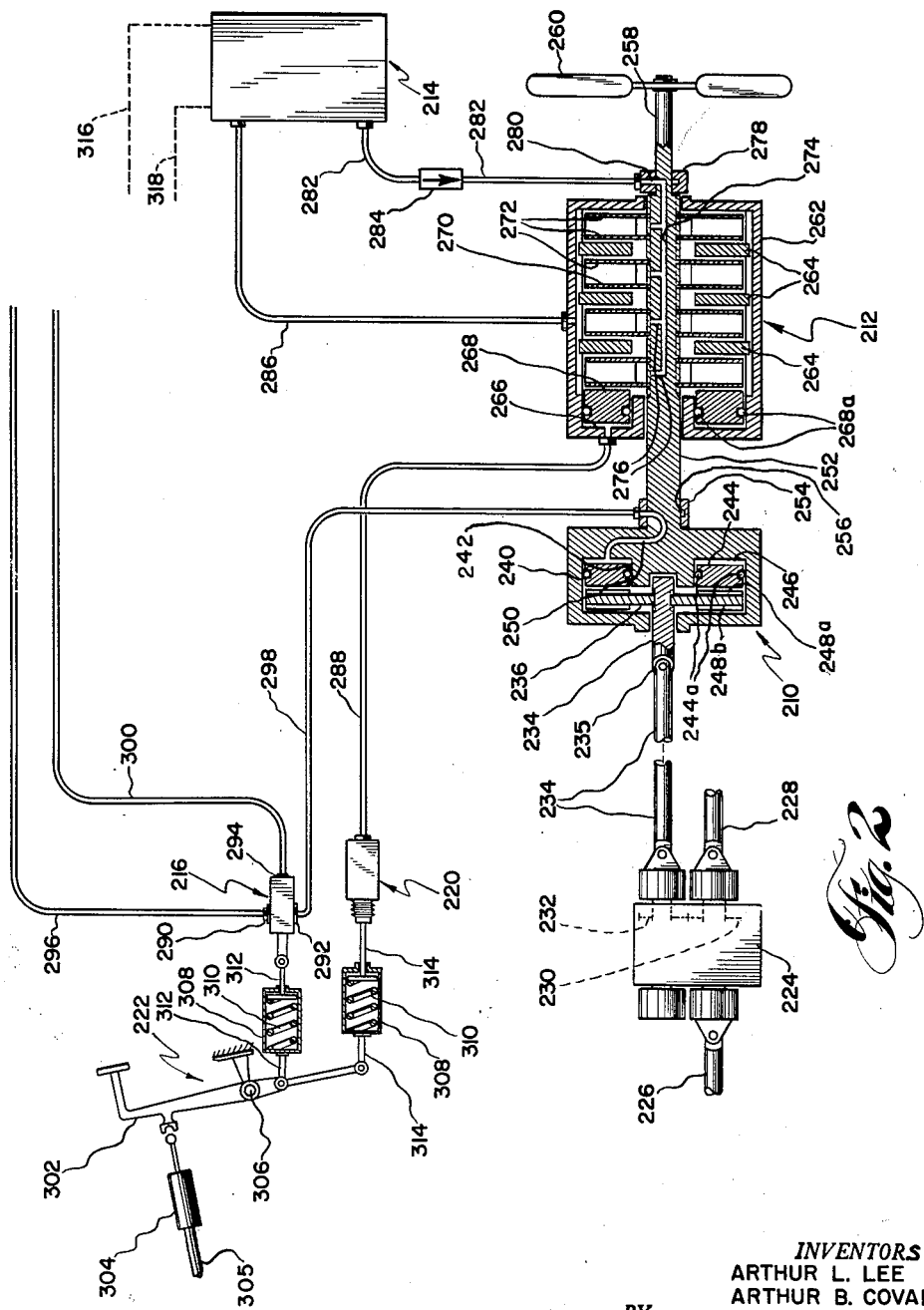

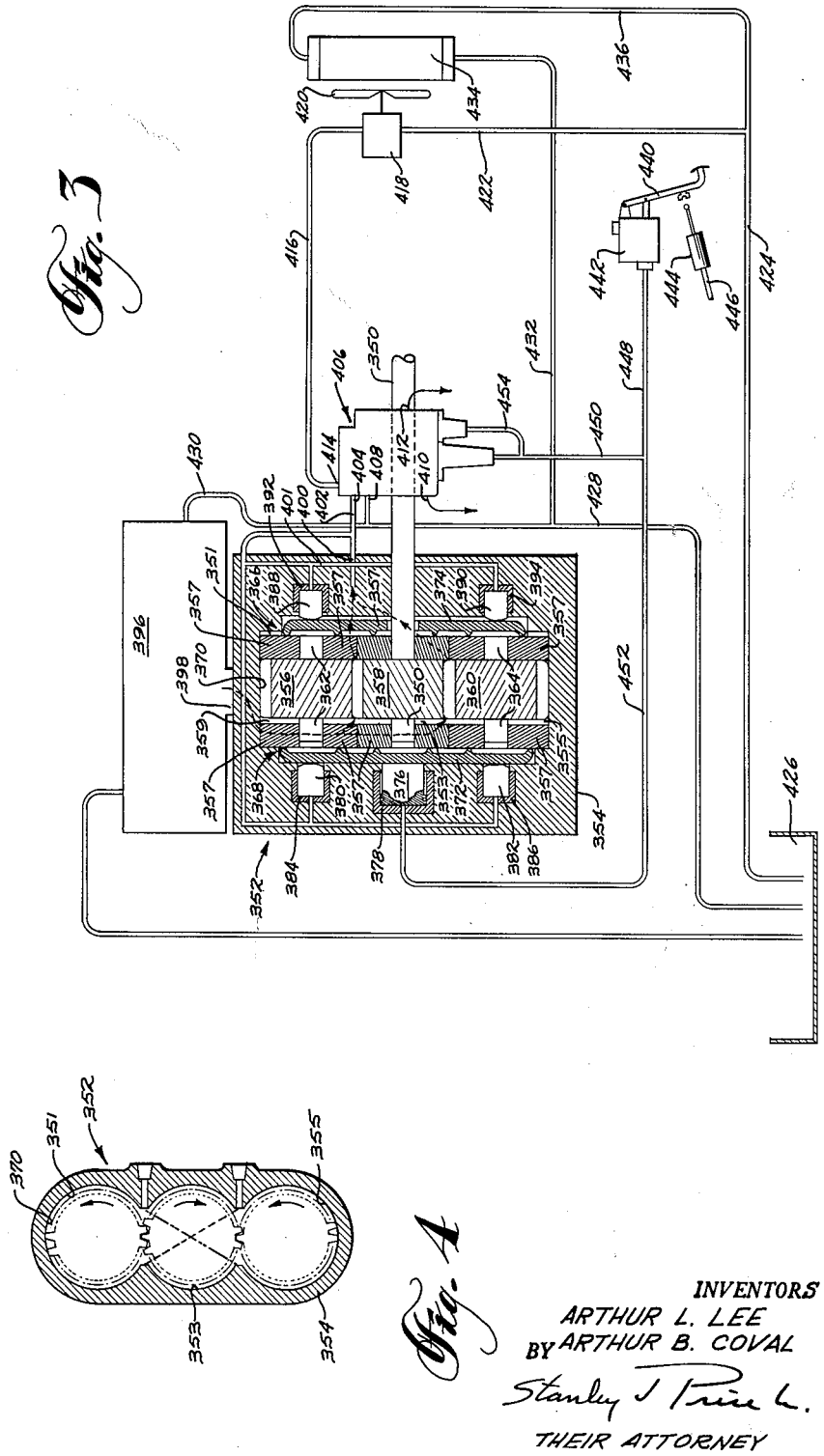

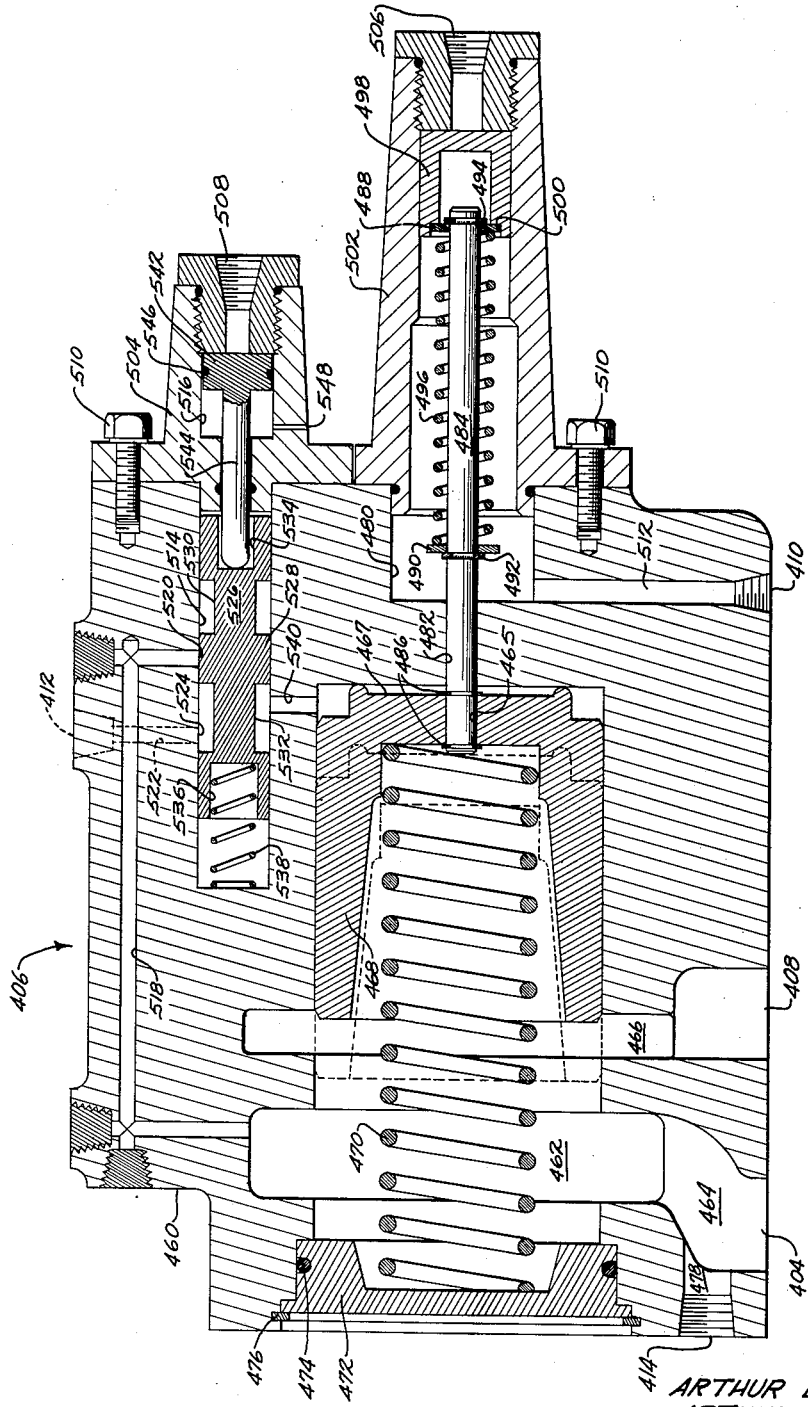

This invention relates to a vehicle braking apparatus and more particularly to a kinetic absorption braking apparatus for supplying an auxiliary braking force to a vehicle.

The present application is a continuation-in-part of our copending application Serial No. 3,942, filed January 21, 1960, now forfeited, and assigned to the assignee of the present invention.

The present invention contemplates the provision of a continuous hydraulic circuit, or a combination of a hydraulic circuit and friction braking means, to absorb kinetic energy generated by the motion of a vehicle to be braked. Through the use of the hydraulic circuit, kinetic energy may be absorbed and the heat generated during the absorption may be easily dissipated.

One form of the present invention provides a positive displacement pump which may be drivingly connected to the vehicle wheels to continuously pump fluid through a variable resistance device in a closed hydraulic circuit. A clutch is provided to disengage the positive displacement pump from the vehicle wheels when no braking force is required. When it is desired to apply a braking force to the vehicle, the clutch is engaged and the hydraulic circuit is restricted by the variable resistance device so that the back pressure from the hydraulic circuit requires an increased driving torque to be supplied to the positive displacement pump. This increased driving torque required by the positive displacement pump exerts a braking force in the vehicle since, when the clutch is engaged, the positive displacement pump is drivingly connected to the wheels of the vehicle. The clutch operates to disengage the positive displacement pump so that the positive displacement pump does not consume and dissipate power of the vehicle prime mover during those operating conditions when the vehicle is not being braked.

A second form of the present invention provides for a combination hydraulic circuit and mechanical friction braking means to apply a braking force to the vehicle. A unique combination multiple disc brake-centrifugal pump unit is drivingly connected to the vehicle wheels through a clutch mechanism. The clutch mechanism is operable to drivingly connect the combination multiple disc brake-centrifugal pump unit to the wheels of the vehicle when the vehicle is to be braked and to disengage the unit from the wheels of the vehicle when the vehicle is not to be braked. The combination multiple disc brake-centrifugal pump unit, when being driven by the vehicle wheels, applies a frictional braking force to the vehicle and, at the same time, pumps hydraulic fluid through a closed circuit to impose an increased torque requirement upon the pump and to more easily dissipate heat generated by the absorption of kinetic energy created by the motion of the vehicle. As in the other form of the invention, the clutch operates to disengage the combination multiple disc brake-centrifugal pump unit from the wheels of the vehicle so that the unit does not consume and dissipate power from the vehicle prime mover during conditions when the vehicle is not to be braked.

A third form of this invention provides a positive displacement pump which is drivingly connected to the vehicle wheels to continuously pump fluid through a closed circuit. The positive displacement pump is a gear type pump which has movable bushings or end plates. The postive displacement pump does not circulate fluid in the closed hydraulic circuit when the end plates are spaced from the rotating gears. A fluid pressure actuated device is arranged to move the end plates into sealing relation with the rotating gears to circulate the fluid in the closed hydraulic circuit. A valve controls the rate of flow through the circuit and the pressure of the fluid in a portion of the circuit. A second means, responsive to the pressurized fluid in the closed hydraulic circuit, further urges the pump end plates into sealing relation with the rotating gears.

The valve device utilized in the third form of the invention serves as restrictor device in the closed hydraulic circuit to control the fluid pressure of a portion of the circuit. The valve device includes a positive means to relieve the fluid pressure on the pump end plates when the operator releases the auxiliary brake. The valve device includes a pressure regulating means for the hydraulic circuit.

In this form of the invention the gears of the positive displacement pump are directly connected to the vehicle drive train through the pump drive shaft. When the brake is disengaged, the gears freely rotate in the pump housing and do not circulate fluid through the closed hydraulic circuit because the pump end plates are in spaced relation with the gear side walls.

The present invention, in all embodiments, also contemplates a master control linkage operated by the vehicle operator to actuate the auxiliary braking apparatus prior to the conventional vehicle braking system so that a braking force will be imposed upon the vehicle prior to the braking force imposed by the conventional braking system. Throughout this specification, the term "conventional braking system" will be utilized to designate a braking system of the type oridinarily provided on automotive vehicles. Generally, the conventional braking system will consist of a closed hydraulic circuit actuated by a master cylinder which transmits the force applied to the master cylinder to brake shoe units operatively connected to the wheels of the vehicle. The term "conventional braking system" also encompasses the compressed air actuated vehicle braking systems such as are utilized on large trucks.

It is recognized in the field of automotive braking that one of the major problems encountered is the fact that the brake system components are subject to high temperatures generated by the absorption of kinetic energy created by the motion of the vehicle. The high temperature operation of the conventional braking system components causes the components to become distorted and to vary from their manufactured sizes. This variation in size and shape produces a phenomenon known as "brake fade" during which the brakes of a vehicle have reduced effectiveness. If the amount of work required of the conventional braking system can be reduced, the high temperatures associated with the conventional braking system can also be reduced and the likelihood of the occurrence of brake fade can be correspondingly reduced or eliminated. In addition to the reduction of brake fade, if the work load of the conventional braking system can be reduced, the component parts of the conventional brake system will have an increased life. The auxiliarly braking system of the present invention serves to reduce the overall speed of the vehicle before the conventional braking system is actuated. This initial reduction in speed, accordingly, reduces the amount of work required by the conventional braking system in bringing the vehicle to a stop. Thus, the present invention reduces the possibility of the occurrence of brake fade on the conventional braking system and also increases the life of the component parts of the conventional braking system.

Provision is made in the master control linkage of the present invention to over-ride the vehicle auxiliary braking apparatus in the event of malfunction of the auxiliary braking apparatus so that the functioning of the conventional braking system will be unimpaired by malfunctioning of the auxiliary braking apparatus.

With the foregoing considerations in mind, it is a primary object of the present invention to provide an efficient kinetic absorption vehicle braking apparatus.

It is another object of this invention to provide a kinetic absorption braking apparatus utilizing a continuous hydraulic circuit to apply braking force to the vehicle and to dissipate the heat generated by the absorption of the kinetic energy of the vehicle.

Another object of this invention is to provide a brake utilizing a continuous hydraulic circuit in which the pump of the circuit rotates only when a braking force is to be applied to the vehicle.

Still another object of this invention is to provide an efficient auxiliary braking apparatus to apply a braking force to the vehicle in addition to the braking force provided by the conventional vehicle braking system.

A further object of the present invention is to provide master control linkage to actuate both the conventional vehicle braking system and the auxiliary braking apparatus in proper sequence to provide most efficient vehicle braking.

Another object of the invention is to provide an auxiliary braking apparatus whose braking force on the vehicle may be progressively increased by the vehicle operator.

These and other objects of this invention will become apparent as this description proceeds in conjunction with the accompanying drawings.

In the drawings:

FIGURE 1 is a schematic view of a braking apparatus constructed in accordance with the principles of the present invention.

FIGURE 2 is a schematic view of a second embodiment of a braking apparatus constructed in accordance with the principles of the present invention.

FIGURE 3 is a schematic view of a third embodiment of a braking apparatus constructed in acordance with the principles of the present invention.

FIGURE 4 is a view in side elevation of the positive displacement gear pump.

FIGURE 5 is a sectional view of the modulating valve utilized in the embodiment illustrated in FIGURE 3.

*Description—Embodiment I*

Referring now to FIGURE 1, there is shown an embodiment of the invention which utilizes a continuous hydraulic circuit to apply a braking force to a vehicle. The braking apparatus shown in FIGURE 1 consists of a clutch mechanism 10, a positive displacement pump 12, a fluid reservoir 14, dump valve 16, a pressure regulator or variable resistance 18, master cylinder 20, master control linkage 22, and the associated fluid conduit.

For purposes of illustration, in FIGURE 1 and 2 the braking apparatus has been shown operatively associated with a vehicle transmission 24. The transmission 24 may be of the constant mesh type disclosed and claimed in Reissue Patent Number Re. 24,327, issued to Arthur L. Lee on June 11, 1957. The transmission 24 has an input shaft 26 which is driven by the vehicle prime mover (not shown). The input shaft 26 drives a series of constant mesh gears which have hydraulic clutches associated therewith operable to engage various speed ratios. An output shaft 28 is driven at various fixed speed ratios of the input shaft speed. The output shaft 28 rotates as a unit with the transmission clutch housing 29 and the transmission gear 30. Gear 30 meshes with transmission gear 32 which rotates as a unit with the transmission clutch housing 33 and the brake shaft 34. Transmission output shaft 28 is ordinarily the vehicle drive shaft which drives the driven wheels of the powered vehicle. It will be appreciated that the brake shaft 34 is, by virtue of its constant mesh driving connection with the transmission output shaft 28, drivingly connected to the wheels of the vehicle and rotates at a speed proportional to the vehicle speed. Thus, as shown in FIGURE 1, the braking apparatus is operatively associated with a brake shaft 34 mounted on the vehicle transmission. However, the brake shaft 34 of the braking apparatus could be attached directly to a vehicle axle, the vehicle differential, or other components of a vehicle which would drive the brake shaft 34 at a speed proportional to the vehicle speed.

The brake shaft 34 has a universal connection 35 therein. Beyond the universal connection 35, brake shaft 34 has a clutch driving portion 36 secured thereto for rotation therewith. Clutch driving portion 36 is free to move axially of shaft 34 but can not rotate relative to shaft 34. A housing-like clutch driven portion 38 envelopes the clutch driving portion 36 and rotates relative thereto when the clutch 10 is disengaged.

Clutch driven portion 38 has an axially extending annular outer wall 40, an axially extending annular intermediate wall 42, and an annular inner wall 44. An inner annular piston 46 occupies the space between the inner wall 44 and the intermediate wall 42. Annular piston 46 has O-rings 46a which provide a fluid seal between the annular piston and walls 42 and 44. An outer annular piston 48 occupies the annular space between intermediate wall 42 and outer wall 40 and has O-ring seals 48a to provide a fluid seal with those walls. An inner fluid actuating chamber 50 and an outer fluid actuating chamber 52 are created by the location of the respective annular pistons 46 and 48 between walls 42 and 44 and walls 40 and 42 respectively.

Clutch driving portions 36 has three annular friction surfaces 54a, 54b and 54c formed thereon. When fluid under pressure is admitted to actuating chamber 50, annular piston 46 is forced into contact with friction surface 54a, and forces friction surface 54c into contact with the end wall of clutch driven portion 38. In a like manner, when fluid is admitted to the actuating chamber 52, annular piston 48 moves into contact with a friction surface 54b and forces friction surface 54c of the clutch driving portion 36 into contact with the end wall of the clutch driven portion 38. Thus, when either one or both of the chambers 50 and 52 have pressurized fluid admitted to them, the clutch driving portion is engaged by the clutch driven portion so that there is rotary power transmitted through the clutch assembly 10.

The clutch driven portion 38 has passages 56 and 58 formed therein. The passages 56 and 58 pass through the pump shaft 60 which is formed integrally with the clutch driven portion 38. A fixed journal member 62 supports the rotatable pump shaft 60 and has formed therein annular passages 64 and 66 which communicate with passages 56 and 58 respectively to admit fluid into passages 56 and 58. Passages 56 and 58 communicate with chambers 50 and 52 respectively to admit fluid into chambers 50 and 52 under clutch actuating conditions as will be described.

The pump shaft 60 drives the positive displacement pump 12 when pump shaft 60 is rotated. The positive displacement pump 12 may be of any suitable form, its exact construction forming no part of the present invention. Pump 12 may, for example, be a standard gear pump. An extension 68 of the pump shaft 60 extends through the housing of the positive displacement pump 12 and has a fan 70 secured thereto. Fan 70 may be so positioned as to draw ambient air over the housing of pump 12 to dissipate heat which may be accumulated by the pump housing. Pump 12 and fan 70 are shown schematically. It will be appreciated that a suitable heat exchanging housing may be designed for pump 12 to utilize the heat exchange provided by the fan 70 most efficiently.

The positive displacement pump 12 has a pump suction inlet 72 and a pump pressure outlet 74. A pump inlet conduit 76 from the reservoir 14 communicates with the pump suction inlet 72. A pump outlet conduit 78 conducts pressurized fluid from the pump outlet 74 to the pressure inlet port 80 of the dump valve 16.

In addition to the pressure inlet port 80, dump valve 16 has a first outlet port 82, a second outlet port 84, a third outlet port 86, and a dump valve control handle 87. A dump valve first outlet conduit 88 connects the outlet port 82 with the pressure regulator or variable resistance 18. The dump valve second outlet conduit 90 connects the outlet port 84 with the journal member 62 so that the dump valve second outlet port communicates with the clutch outer actuating chamber 52. The dump valve third outlet conduit 92 connects the third outlet port 86 to the fluid reservoir 14.

The dump valve 16 has two operating poistions which are governed by the position of dump valve control handle 87. The control handle 87 is spring loaded to the raised position as shown in FIGURE 1. When in this raised position, handle 87 positions the dump valve 16 so that the pressure inlet port 80 communicates with the third outlet port 86 and prevents fluid communication with the first and second outlet ports 82 and 84 respectively. When the dump valve control handle 87 is forced downwardly to its actuated position, the pressure inlet port 80 communicates simultaneously with the first and second outlet ports 82 and 84 respectively, and the outlet port 86 is closed. The purpose of dump valve 16 will become apparent as this description proceeds.

The pressure regulator or variable resistance 18 is provided to throttle the hydraulic circuit and to control the pressure within the hydraulic circuit. While a pressure regulating valve is shown in this embodiment, any equivalent structure which will create a variable resistance to the flow of hydraulic fluid through the circuit may be utilized. The pressure regulator has a pressure inlet port 94 and a pressure outlet port 96. A pressure control spring 98 controls the pressure of the fluid in conduit 88 since the greater the force exerted by spring 98, the greater pressure required in conduit 88 to overcome the force of the spring and permit flow of fluid through regulator 18. The pressure control spring 98 has a dual function insomuch as it also serves as one of the overriding links of the auxiliary braking apparatus. This over-riding function will be explained in greater detail at a later point in this description. A conduit 100 is provided to connect the outlet port 96 of the regular 18 with the reservoir 14.

The pressure regulator 18, although not shown in detail, is conventional in construction. It has a throttle valve member which controls the flow of fluid between the pressure inlet port 94 and the pressure outlet port 96. The throttle valve reciprocates relative to the fixed valve seat under the influence of fluid pressure within the inlet port 94. To accomplish movement of the throttle valve in response to fluid pressure, a flexible diaphragm is secured to the valve stem and is exposed to fluid pressure within the inlet port 94. The fluid pressure urges the diaphragm to open the throttle valve and permit increased fluid flow through the regulator. This diaphragm motion is opposed by the force of a spring within the regulator which tends to close the throttle valve, thereby reducing the amount of flow. The spring within the regulator is attached at one end to a cam follower which causes the spring to be placed under varying degrees of compression between the diaphragm and the cam follower depending upon the position of a cam slidably received in the top of the pressure regulator.

The cam is rigidly secured to spring 98 in the variable resistance actuating arm 116. Thus, when the actuating arm 116 is moved to the right, as viewed in FIGURE 1, the spring 98 is placed under increased compression. This movement causes the cam in pressure regulator 18 to move to a position that increases the compression on the spring within regulator 18. When the compression is increased on the spring within regulator 18, the pressure under the diaphragm required to oppose the spring force and move the throttle valve away from the seat must be increased to be effective. It will be seen that the spring 98, by positioning the cam, controls the compression of the spring within regulator 18 which, in turn, controls the amount of pressure that must be built up within the inlet port 94 of regulator 18 before the throttle valve is unseated and flow through regulator 18 takes place. It will also be noted that the greater the pressure required to unseat the throttle valve, the greater is the back pressure in line 88 and the greater is the resistance to flow in the circuit including pump 12.

The master cylinder 20 which provides pressurized fluid to the clutch actuating chamber 50 is provided to generate fluid pressure when actuated by the piston plunger 102. The master cylinder is of conventional construction and its exact structure forms no part of the present invention. When piston plunger 102 is forced to the right as viewed in FIGURE 1, a fluid pressure is generated in conduit 104 which connects the master cylinder 20 to the journal member 62 and provides fluid communication from master cylinder 20 into the clutch inner fluid actuating chamber 50. Operatively connected to the plunger 102, an over-riding link consisting of an outer cylinder 106 and a spring 108 is provided for a purpose to be described. The spring 108 biases the plunger piston 102 away from the opposite end wall of cylinder 106.

The master control linkage 22 consists of the conventional vehicle brake pedal 110 which is pivoted about the fixed pivot 114 for movement relative thereto. The brake pedal 110 is arranged to actuate the master cylinder 112 for the conventional vehicle braking system. The hydraulic line 113 conducts fluid from master cylinder 112 to the conventional braking system. Further, the pedal 110 has associated therewith and connected thereto the variable resistance actuating arm 116 which controls the dump valve actuating cam 118 and also has connected thereto a master cylinder actuating arm 120 which is secured at its other end to the cylinder 106 of the over-riding link.

The reservoir 14 may be equipped with a liquid cooling system which is a part of the vehicle cooling system and which is cooled through the vehicle engine radiator. In this event, the reservoir casing is provided with fluid coolant passages (not shown) and cooling circuit lines 122 and 124 are provided to conduit water from the reservoir casing coolant passages through the vehicle radiator. This reservoir cooling system is an optional feature of the instant brake apparatus. In some applications to which the brake will be put, the frequency of operation and the amount of braking force required will require that additional cooling means be provided to cool the hydraulic circuit of which the reservoir 14 is a part. In other applications, the reservoir 14 can be cooled sufficiently by the passage of air about its casing.

*Operation—Embodiment I*

With the foregoing details of construction and arrangement in mind, the operation of the present braking apparatus may be considered. In order to fully describe the braking apparatus, it will be considered as installed on a powered vehicle having a prime mover driving the transmission 24 which in turn drives wheels of the vehicle. The vehicle will be considered in motion and the braking apparatus will first be considered in its unactuated condition.

With the brake in the unactuated condition, and the vehicle in motion, the transmission input shaft 26 will be driven by the prime mover and will drive the transmission output shaft 28 at any one of several fixed speed ratios depending upon the speed ratio of transmission 24 then engaged. The brake shaft 34 will be driven at a speed proportional to the transmission output shaft 28 and therefore proportional to the vehicle speed. The brake pedal 110 will be in the unactuated position shown in FIGURE 1. The resistance actuating arm 116 and the cam 118 will be in the position shown in FIGURE 1. The master cylinder 20 will not be actuated since the plunger actuating arm 120 will not be moved. The dump valve 16 will be in its normal position so that the inlet 80 will communicate with the outlet 86 and vent any fluid in conduit 78 back through conduit 92 to the reservoir 14.

In this unactuated condition of the braking apparatus, the clutch 10 will be disengaged since neither chambers 50 nor 52 will have fluid pressure conducted to them. The brake shaft 34, being driven at the transmission output shaft speed, will drive the clutch driving portion 36. With the clutch disengaged, however, no driving force will be transmitted from the clutch driving portion 36 to the clutch driven portion 38. The positive displacement pump 12 will, accordingly, be at rest. The fan 70 will not be rotating.

The braking apparatus will next be considered as it is actuated to provide a braking force to the moving vehicle. When the vehicle operator considers the vehicle speed to be excessive, he depresses the brake pedal 110. The first movement of brake pedal 110 actuates the master cylinder 20 to provide pressurized fluid in conduit 104 which conducts the pressurized fluid to the inner actuating chamber 50 of clutch 10. This action causes the clutch 10 to be engaged with a force proportional to the pressure generated by master cylinder 20. This engagement of clutch 10 is sufficient to initiate rotation of pump shaft 60 and to initiate the rotation of the positive displacement pump 12. The positive displacement pump 12 as it begns to rotate draws fluid from reservoir 14 through inlet conduit 76 and discharges it through outlet conduit 78 to the dump valve 16. The dump valve 16 remains in its unactuated position so that the fluid entering the inlet port 80 is vented into the discharge port 86 and back to reservoir 14 through conduit 92.

As the vehicle operator further depresses the brake pedal 110, the resistance actuating arm 116 is moved to the right as viewed in FIGURE 1 so that cam 118 is moved to the right as viewed in FIGURE 1. This movement of actuating arm 116 and cam 118 has a two-fold effect. First, the cam 118 as it moves to the right, causes the dump valve control handle 87 to be depressed by the cam surface 118a moving over it. As cam surface 118a depresses the dump valve control handle 87, the dump valve is moved to its actuated position so that the inlet port 80 now communicates simultaneously with outlet ports 82 and 84 and the outlet port 86 is blocked. Fluid from the positive displacement pump discharge port 74 must now pass into conduits 88 and 90 rather than being returned to the fluid reservoir 14.

The conduit 88 conducts the pressurized fluid through the pressure regulator or variable resistance 18. The second effect attributable to the movement of the resistance actuating arm 116 is that the spring force on pressure control spring 98 more firmly exerts a force on the pressure regulator to increase the pressure required in conduit 88 before fluid may flow through the pressure regulator 18 into conduit 100 and back to the fluid reservoir. The back pressure created by the variable resistance 18 causes a resisting force to be exerted upon the impeller of the positive displacement pump 12. Thus, an increased driving torque is required by the impeller of the positive displacement pump 12.

In addition to the increased driving torque required by the positive displacement pump impeller, the higher pressure produced in line 88 also finds its way into conduit 90 which is in simultaneous communication with the inlet port 80 and outlet port 82 of the dump valve 16. The pressurized fluid in conduit 90 is conducted to the journal member 62 and thence into the outer clutch actuating chamber 52. Thus, the clutch 10 is more forcefully engaged by virtue of the fact that the high pressure in conduit 90 exerts the engaging force on the clutch piston 48 to engage clutch 10.

It will be noted that as the operator continues to depress the brake pedal, the resistance actuating arm 116 causes an increasingly greater force to be applied to the pressure regulator so that the pressure in conduits 88 and 90 is increased still further. The back pressure in conduit 78 is accordingly further increased and the driving torque required by the impeller of positive displacement pump 12 is also increased. This increased driving force on the impeller of pump 12 is transmitted back through the shaft 60, the clutch 10, and the brake shaft 34 to exert a braking force on the transmission output shaft 28 and eventually on the wheels of the vehicle. Further, the clutch 10 is more forcefully engaged by the pressure in conduit 90 so that it is able to transmit this increased driving force without slippage of clutch 10.

As the operator still further depresses the brake pedal 110, it finally comes into contact with the actuating portion of master cylinder 112 which actuates the conventional vehicle braking system. Thus, the auxiliary braking system shown in FIGURE 1 is actuated to provide a braking force to the vehicle prior to the actuation of the conventional braking system controlled by master cylinder 112.

During those periods when the pump 12 is being driven through clutch 10, the fan 70 operates to draw ambient air over the housing of pump 12 to dissipate heat which may be generated in the hydraulic circuit. In addition, the optional cooling system for reservoir 14, which consists of conventionally formed coolant passages in the reservoir casing connected to the vehicle radiator by cooling lines 122 and 124, may be utilized depending upon the application of the braking apparatus of the instant invention.

The over-riding linkage consisting of the cylinder 106 and the spring 108 is provided to insure that any malfunction of the auxiliary braking apparatus will not prevent operation of the conventional braking system controlled by master cylinder 112. The spring 108 is ordinarily of such strength that the forces applied to master cylinder actuating arm 120 will not be sufficient to compress it and, for all practical purposes, it is a rigid member connecting actuating arm 120 and plunger 102. However, if the master cylinder should malfunction so as to become frozen in place, for example, then an increased force applied to the brake pedal 110 by the vehicle operator can compress spring 108 to allow movement of the brake pedal without a corresponding movement in the master cylinder 20. Further, the pressure control spring 98 has a function similar to the over-riding link formed of cylinder 106 and spring 108. The control spring 98 will also permit movement of brake pedal 110 in the event that the pressure regulator valve 18 becomes frozen and cannot be moved.

*Description—Embodiment II*

Referring now to FIGURE 2, a second embodiment of the vehicle braking apparatus will be described in detail. The braking apparatus of FIGURE 2 consists generally of a clutch mechanism 210, a combination multiple disc brake-centrifugal pump unit 212, fluid reservoir 214, on-off control valve 216, master cylinder 220, master control linkage 222, and associated fluid conduit.

As in the previously described embodiment, the braking apparatus of FIGURE 2 will be described as it is installed on a specially provided braking shaft of the vehicle transmission. The constant mesh transmission 224 has a transmission input shaft 226 which is driven by the prime mover (not shown) of the vehicle. The transmission output shaft 228 is driven at various fixed speed ratios to the input shaft 226. The transmission output shaft 228 is the drive shaft for the vehicle and drives the vehicle wheels (not shown). A gear 230 is operatively secured to output shaft 228 and rotates as a unit therewith. Gear 232 rotates as a unit with the brake shaft 234 and meshes with gear 230.

Brake shaft 234 has a universal 235 therein and non-rotatably receives the clutch driving portion 236 as shown in FIGURE 2. The clutch driving portion is free to move axially of brake shaft 234. A housing-like clutch driven portion 238 envelopes the clutch driving portion 236 and has an outer axially extending annular wall 240 and an inner axially extending annular wall 242. An annular piston 244 is received between the inner and outer walls 242 and 240 and is sealed relative thereto by O-ring seals 244a. Pressurized fluid, when conducted to fluid actuating chamber 246 formed behind annular piston 244, forces piston 244 into engagement with annular friction surface 248a formed on the clutch driving portion and forces the clutch driving portion friction surface 248b into contact with the end wall of housing 238 to engage the clutch driving portion. A passage 250 is formed in the clutch driven portion 238 and in the clutch driven shaft 252 formed integrally therewith to permit fluid to enter the actuating chamber 246 and thereby actuate clutch 210. A fixed journal member 254 surrounds the rotatable clutch driven shaft 252 and has formed therein an annular passage 256 to permit constant fluid communication between the stationary journal member and the passage 250 in the rotating clutch driven portion.

The clutch driven shaft 252 extends through the combination disc brake and pump unit 212 and forms an integral part thereof to be described. Shaft 252 has an extension 258 to which is nonrotatably secured fan 260 which may be adapted to draw ambient air over the housing 262 of the combination brake and pump.

The generally cylindrical internal surface of housing 262 has annular brake discs 264 splined thereto so that brake discs 264 may move axially relative to housing 262 but can not rotate relative to housing 262. Formed in one end wall of housing 262 is an annular fluid actuating chamber 266 which receives annular piston 268. O-ring seals 268a seal annular piston 268 relative to the annular fluid actuating chamber 266.

Splined to the clutch driven shaft 252 are a series of combination pump impeller-brake plates 270. The pump impeller-brake plates 270 are of substantial thickness and are generally cylindrical in form. The cylindrical plates 270 have parallel circular end surfaces. Passages 272 are formed in plates 270 between the end surfaces. Passages 272 are formed in the shape of a conventional centrifugal pump impeller. Thus, the plates 270 perform the dual function of brake discs and centrifugal pump impellers.

A fluid inlet passage 274 is formed longitudinally in shaft 252. This passage 274 has a series of branches 276 which communicate with central openings in plates 270 to permit fluid communication from passage 274 into the passages 272 of the respective plates 270.

A fixed journal member 278 surrounds the rotatable extension 258 of shaft 252 and has an annular passage 280 therein to provide a continuous fluid inlet from the stationary journal member to the rotating shaft passage 274. An inlet conduit 282 communicates with the journal member and conducts fluid from the reservoir 214 to the journal member 278. A check valve 284 is provided to permit flow through conduit 282 only from reservoir 214 to passage 274 and not in the reverse direction.

A centrifugal pump outlet conduit 286 communicates with the interior of housing 262 and conveys fluid under pressure from the housing back to reservoir 214.

The function of the combination multiple disc brake-centrifugal pump unit 212 may be summarized with the foregoing details of its construction in mind. The individual impeller-brake plates 270 having the passages 272 formed therein are the equivalent of centrifugal pump impellers. Fluid enters the plates 270 through passage 274 and is pumped with a centrifugal pumping action into the conduit 286 which returns it to reservoir 214. This circulation of fluid tends to cool the combination brake and pump unit 212 and also induces an additional driving torque on the shaft 252 since the passage of fluid through the circuit tends to inhibit rotation of the shaft 252. Thus, the circulation of fluid from reservoir 214 through the unit 212 and back to reservoir 214 serves the dual purpose of cooling the unit 212 and requiring an additional driving torque on shaft 252.

The annular piston 268 in the unit 212 is provided to actuate the braking function of the combination unit. When fluid under pressure is admitted to chamber 266, piston 268 is forced axially against the plates 270 and causes them to move axially into frictional engagement with the discs 264 splined to the housing 262. Thus, a frictional braking force is created between the rotating shaft 252 and the stationary housing 262. A conduit 288 conveys fluid under pressure from master cylinder 220 to chamber 266 when master cylinder 220 is actuated.

The on-off control valve 216 is provided to control the flow of pressurized fluid to the clutch 210. The control valve 216 has a pressure inlet 290, a pressure outlet 292, and a vent outlet 294. A pressure inlet conduit 296 joins a source of fluid pressure (not shown) to the pressure inlet 290 of valve 216. Any source of pressure may be utilized for the pressure to inlet 290. For example, an accessory pump on the vehicle transmission or an accessory pump on the vehicle engine may provide the pressure for the conduit 296. A conduit 298 conducts fluid under pressure from valve 216 to the journal member 254 and thence into chamber 246 of clutch 210. Conduit 298 may also vent chamber 246 when the valve 216 is so positioned to provide venting of chamber 246. Vent conduit 300 provides the pressure return to the source of pressure for valve 216.

In some instances it is desirable not to have an alternate source of pressure provide pressure for clutch chamber 246. In these instances, conduit 298 is made to communicate with conduit 288 and the valve 216 is not utilized. In such instances master cylinder 220 provides pressurized fluid for both the clutch chamber 246 and the actuating chamber 266 of unit 212.

The master control linkage 222 includes the brake pedal 302 which pivots about a fixed pivot 306. A master cylinder 304 for the conventional vehicle braking system is provided in proximity to pedal 302 to be actuated by pedal 302 in sequence with the auxiliary braking apparatus. A hydraulic line 305 conducts pressurized fluid from master cylinder 304 to the conventional braking system. A pair of over-riding units 308 having springs 310 are provided in the on-off valve actuator linkage 312 and the master cylinder actuator linkage 314 respectively. These over-riding units are similar to those described in connection with the previously described embodiment of the invention.

As in the case of the previously described embodiment of FIGURE 1, the reservoir 214 may be provided with an optional liquid cooling system which consists of liquid coolant passages formed in the casing of reservoir 214 and liquid coolant lines 316 and 318 adapted to connect the reservoir cooling system with the conventional vehicle cooling system. This optional coolant system may be provided when the applications of the auxiliary braking apparatus so require.

*Operation—Embodiment II*

With the foregoing details of construction and arrangement of the braking apparatus of FIGURE 2 in mind, its function will be considered. As before, the braking system will be considered on a vehicle with a prime mover driving transmission input shaft 226 which in turn drives transmission output shaft 228 and brake shaft 234 at a speed proportional to the vehicle speed. The braking apparatus will first be considered in its unactuated position as shown in FIGURE 2.

In the actuated position shown in FIGURE 2, the on-off control valve 216 is in its normal unactuated position so that conduit 296 from the source of fluid pressure (not shown) is closed and so that conduit 298 communicates with vent conduit 300 to vent conduit 298 to the return for the source of pressure. Since conduit 298 is vented, chamber 246 of clutch 210 is vented and clutch 210 is disengaged. With clutch 210 disengaged and the vehicle in motion, shaft 228 is rotating at a speed proportional to the vehicle speed, and brake shaft 234 is rotating at a speed proportional to the vehicle speed. The clutch driven shaft 252 is stationary since clutch 210 is disengaged.

With the brake in the unactuated position shown in FIGURE 2, the master cylinder 220 is not actuated and there is no pressurized fluid in conduit 288. Accordingly, there is no braking force on the combination brake and pump unit 212. Since the shaft 252 is stationary, no fluid is being pumped from reservoir 214 through unit 212.

Consider now the vehicle having attained speed where the vehicle operator wishes to impose a braking force on the vehicle to reduce its speed. The operator depresses brake pedal 302. The master cylinder 220 will be actuated to provide a braking force in the combination brake and pump unit 212 by providing fluid under pressure in chamber 266. At the same time, the valve 216 will be actuated so that the pressure from conduit 296 will be conducted through conduit 298 into chamber 246 of clutch 210 to thereby engage clutch 210 and drivingly connect shaft 252 with the brake shaft 234. Thus, the shaft 252 and brake discs 270 of the combination brake and pump 212 will begin to rotate and pump fluid through the unit 212 from reservoir 214 and back to reservoir 214. This pumping of fluid will serve to both cool the unit 212 and provide a resisting torque on the shaft 252. With the brake 210 engaged, this resisting torque imposed on shaft 252 by the fluid resistance and by the braking force exerted by annular piston 268 will be transmitted to the brake shaft 234. The brake shaft 234 being driven at a speed proportional to the output shaft 228, and accordingly being rotated at a speed proportional to the vehicle speed, will exert a braking force on the vehicle.

As the operator continues to depress the brake pedal 302, he will engage the actuating portion of valve 304 to actuate the conventional vehicle braking system.

As described in connection with the previously described embodiment of FIGURE 1, the over-riding linkages 308 have springs 310 of sufficient force so that there is no relative movement in the linkages unless there is an abnormal malfunction of master cylinder 220 or on-off valve 206 in which case a sufficient force may be exerted by the vehicle operator to overcome the force of springs 310 and actuate the conventional vehicle braking system in spite of the malfunction of the auxiliary braking apparatus.

It will be noted that the braking apparatus of the instant invention provides normally deactuated kinetic absorption braking systems which may be actuated to provide efficient braking force to a vehicle. The advantage of no horsepower loss when the brake is unactuated and the further advantage of providing hydraulic circuits to aid in dissipation of the heat generated by the absorption of the kinetic energy created by the motion of the vehicle are present in these novel structures.

*Description—Embodiment III*

Referring now in detail to FIGURES 3, 4 and 5, another embodiment of this invention is illustrated. In this embodiment the transmission and the shafts extending therefrom are not illustrated. In FIGURE 3 the drive shaft 350 extending from the pump generally designated by the numeral 352 is connected to the vehicle drive train such as shaft 34 or shaft 28 illustrated in FIGURE 1. With the arrangement illustrated in FIGURE 3 the pump drive shaft 350 rotates when the vehicle is moving. The speed of rotation of shaft 350 is, therefore, proportional to vehicle speed.

The positive displacement pump 352 has a housing 354 in which there are three intersecting cylindrical chambers 351, 353 and 355. Gears 356, 358 and 360 are positioned in the respective chambers with gears 356 and 360 meshing with gear 358. The gears serve as an impeller means for the pump 352. The shaft 350 which is connected to the vehicle drive train is schematically illustrated as the journal of gear 358. Gears 356 and 360 have oppositely extending journals 362 and 364 which are suitably supported in bushings to maintain the gears in proper meshing relation with each other.

The housing 354 is so constructed that the chambers 351, 353 and 355 provide a closely spaced peripheral wall or shroud 370 around the gears 356, 358 and 360 so that the gears upon rotation in the respective chambers may circulate fluid therearound by trapping the fluid between the gear teeth and the peripheral shroud 370.

Interposed between the housing 354 and the gears 356, 358 and 360 are six bushings 357 constructed of suitable bearing material. The gear journals 362, 364 and 350 are suitably supported in the respective bushings 357. The three bushings on the right side of the gears in FIGURE 3 are, for convenience, called end plate 366 and the three bushings on the left side of the gears are called end plate 368.

The cylindrical chambers 351, 353 and 355 have an axial dimension greater than the combined axial dimensions of the gears and end plates so that the end plates are movable relative to the gears within the chambers. As illustrated in FIGURE 3 the end plate 368 is spaced from the gears 356, 358 and 360, as indicated at 359. In this position with the space 359 between end plate 366 and gears 356, 358 and 360 the pump 352 is inoperative and the rotation of the gears will not circulate fluid within in the respective chambers. To circulate fluid within the chambers both end plates 366 and 368 must be in abutting sealing relation with the side walls of gears 356, 358 and 360. The fluid within the chambers will urge the end plates 366 and 368 away from the gear side walls so that a positive means must be provided to urge the end plates 366 and 368 against the side walls of gears 356, 358 and 360 if the pump 352 is to circulate fluid therethrough.

A bracket 372 is provided to urge the end plate 368 against the side walls of gears 356, 358 and 360. A similar bracket 374 is positioned to urge end plate 366 against the opposite sides of the gears. The bracket 372 has a laterally extending piston 376 positioned in a cylinder 378. Other pistons 380 and 382 are positioned in cylinders 384 and 386. The pistons 380 and 382 are also arranged to urge the bracket 372 and end wall 368 against the side walls of gears 356, 358 and 360. Pistons 388 and 390 abut bracket 374 and are positioned in cylinders 392 and 394. The pistons 388 and 390 are arranged to urge brackets 374 against end wall 366 to oppose the forces exerted by pistons 380 and 382 on end wall 368 and thereby sealingly position gears 356, 358 and 360 between end walls 366 and 368.

Positioned above the pump housing 354 is a surge tank 396 that has an opening 398 connected to a suction port in pump housing 354. The housing 354 is suitably cored to provide passageways from suction port 398 to outlets where the oil is picked up by the rotating gears as indicated by the dotted lines in FIGURES 3 and 4. The housing is also suitably cored to provide a passageway for the pressurized fluid to flow from the pump housing 354 to outlet port 400. The gear pump 352 circulates fluid in the same manner as a conventional positive displacement gear pump. In the pump schematically illustrated in FIGURE 3, however, the end walls 366 and 368 are movable so that when the brake is not actuated the end walls are in spaced relation with the side wall of the gears and the pump 352 is inoperative to circulate fluid in the circuit. In the brake actuated position, the end walls 366 and 368 are urged against the gear side walls by means of bracket 372 and bracket 374, as later described. When the end wall 368 is urged against the gear side walls, the positive displacement pump circulates fluid between inlet suction port 398 and outlet pressure port 400. In a brake disengaged position wherein the end walls 366 and 368 are spaced from the gear side walls, the gears do not, because of this spaced relationship, circulate the fluid between the inlet port 398 and the outlet port 400. Within the housing 352 there are internal passageways 401 which connect the pressure side of the pump, i.e. adjacent outlet port 400, with the cylinders 384, 386, 392 and 394.

The pump outlet port 400 is connected by means of a conduit 402 to the inlet port 404 of a modulator valve generally indicated by the numeral 406. The modulator valve 406 is illustrated as being separate from the pump 352 and connected thereto by means of conduits. It should be understood, however, that the modulator valve 406 could readily be formed as a part of the pump housing and internal passageways formed in the pump housing to provide many of the conduits hereinafter described.

The modulator valve 406 is shown in detail in FIGURE 5 and has an inlet port 404 and an outlet port 408. The modulator valve 406 has other outlet ports 410 and 412 which will be later described. The valve 406 has an outlet port 414 which is internally connected to the pressure port 404. A conduit 416 connects valve outlet port 414 to a conventional hydraulic motor 418 which drives a fan 420. A conduit 422 connects the hydraulic motor to a common conduit 424 which leads to the sump or reservoir 426. The valve outlet port 408 has a main conduit 428 connected thereto. A branch conduit 430 connects main conduit 428 to surge tank 396. The conduits 428 and 430 may be so constructed and sized that approximately 37 percent of the fluid circulated by pump 352 is recirculated to surge tank 396 through conduit 430. Approximately another 37 percent of the fluid circulated by pump 352 is conducted through conduit 428 to sump 426. A branch conduit 432 is connected to conduit 428 and conducts approximately 25 percent of the fluid circulated by pump 352 to a heat exchanger 434. A conduit 436 conducts the fluid from the heat exchanger 434 to common return conduit 424. With this arrangement approximately 25 percent of the fluid circulated by pump 352 is conducted to the heat exchanger 434 where it is cooled by means of fan 420. Approximately 37 percent of the fluid circulated by pump 352 is conducted to the surge tank 396. The remaining fluid is conducted to the sump or reservoir 426.

The control for the braking apparatus illustrated in FIGURE 3 includes a conventional brake pedal 440 which actuates a master cylinder 442 for the kinetic absorption braking apparatus. The brake pedal 440 is further arranged to actuate the master cylinder 444 for the conventional vehicle braking system. A hydraulic conduit 446 conducts pressurized fluid from the master cylinder 444 to the conventional braking system. A conduit 448 conducts pressurized fluid from cylinder 442 to both the modulator valve 406 and the pump housing 354 through branch conduits 450 and 452. The conduit 450 has another branch conduit 454 which provides pressurized fluid for a pilot operated actuator within modulator valve 406 which is later described. With this arrangement pressurized fluid is simultaneously conducted from cylinder 442 through conduits 448, 452 and 450 to the pump housing 354 and the modulator valve 406 respectively. The conduit 452 is connected to the cylinder 378 within pump housing 354 so that when the operator depresses pedal 440, master cylinder 442 conducts pressurized fluid through conduit 448 and 452 to the rear face of piston 376 within cylinder 378 to thereby urge bracket 372 and end wall 368 toward the side walls of gears 356, 358 and 360. Simultaneously, pressurized fluid is conducted through conduits 450 and 454 to the modulator valve 406.

The modulator valve 406 is illustrated in section in FIGURE 5 and includes a housing 460 with a central cup shaped chamber 462. The valve inlet port 404 is connected to chamber 462 by passageway 464. Similarly, outlet port 408 is connected to chamber 462 by an annular outlet passageway 466. A cup shaped valve member 468 is slidably positioned in chamber 462 and is arranged to move axially in chamber 462 to close outlet passageway 466 as indicated in dotted lines in FIGURE 5. A coil spring 470 urges valve member 468 toward an open position. Circular end plate 472 encloses the end of the valve housing 460 and maintains the spring 470 within chamber 462. Suitable O-rings 474 and snap rings 476 are provided to maintain the end plate 472 in position and seal the end of chamber 462.

A passageway 478 connects outlet port 414 with inlet passageway 464. With this arrangement fluid at elevated pressure is conducted from valve 406 through outlet port 414 to the hydraulic motor 418.

The valve housing 460 has a longitudinal bore 480 axially aligned with the chamber 462. A bore of reduced diameter 482 connects the bore 480 with the chamber 462. The other end of push rod 484 has an annular member 488 positioned thereon. The annular member 488 is movable relative to the push rod 484. A second annular member 490 is positioned on the push rod 484 in spaced relation to the member 488. Snap rings 492 and 494 limit movement of the annular members 488 and 490 in one direction on the rod. A coil spring 496 maintains the annular members 488 and 490 in spaced relation to each other and against the snap rings 492 and 494 respectively. A cup shaped piston 498 is slidably positioned in bore 480 and has an annular shoulder 500 against which annular member 488 on push rod 482 abuts. The housing 460 has end closure members 502 and 504 which include inlet ports 506 and 508 for pressurized fluid from conduits 450 and 454. The closure members 502 and 504 are suitably secured to the housing 460 by means of bolts 510. The closure member 502 has an internal bore which forms an extension of bore 480 in housing 460. The bore 480 has a drain passageway 512 which is connected to outlet port 410. Suitable means may be provided to return the fluid from outlet port 410 to the sump or reservoir 426.

With the above described structure, when the operator depresses pedal 440, pressurized fluid is generated by master cylinder 442 and enters valve inlet port 506 from conduit 450. The pressurized fluid acts on the rear face of the piston 498 and urges the push rod 482 through annular member 488 toward the large cup shaped valve 468. The push rod 482 extends through the bottom wall 467 of cup shaped valve 468 and transmits the axial movement of piston 498 to valve 468. The movement of push rod 482 moves the cup shaped valve 468 from the position indicated in full lines in FIGURE 5 toward the position indicated in dotted lines against the reaction of coil spring 470 in chamber 462. The movement of valve 468 tends to restrict the annular outlet passageway 466 and serves as a restrictor to the circulation of fluid by pump 352 through valve 406. The restriction by means of valve 468 increases the pressure of the fluid within chamber 462 and in turn provides a resistance to rotation of gears 356, 358 and 360. This resistance to rotation is transmitted through shaft 350 to the vehicle drive train which provides a braking force to the vehicle.

The valve housing 460 has another longitudinal bore 514 which is parallel to the bore 480. The closure member 504 has a bore 516 axially aligned with bore 514. The housing 460 has a passageway 518 connecting the chamber 462 with the bore 514 at 520. The housing 460 has another passageway 522 connecting bore 514 at 524 to outlet port 412. Positioned within bore 514 there is a slidable spool 526. The spool 526 has an enlarged annular section 528 and sections 530 and 532 of reduced diameter. The enlarged section 528 effectively seals the bore 514 while sections 530 and 532 are sized to provide cavities between the spool 526 and the bore 514 for the flow of fluid. The spool 526 has bores 534 and 536 in its end portions. A coil spring 538 is positioned in valve housing bore 514 and abuts an end wall of bore 536 of spool 526 thus urging the spool 526 toward inlet port 508. In this position the spool enlarged portion 528 blocks pressure passageway 518 at 520 and the passageway 522 communicates with bore 514. The housing 460 has another passageway 540 that connects the bore 514 with the chamber 462 behind the valve 468. Thus in the position illustrated in FIGURE 5 the portion of chamber 462 behind valve 468 would be connected to outlet port 412 through passageway 540, bore 514 and passageway 522.

Within bore 516 of closure member 504 there is a piston 542 which has a rod-like end portion 544 extending into bore 534 of spool 526. An O-ring 546 provides a fluid tight arrangement of piston 542 in bore 516. A suitable drain passageway 548 may be provided to remove any fluid that may leak into bore 516 and oppose movement of piston 542. With this arrangement pressurized fluid is supplied to inlet port 508 from conduit 454. The piston 542 moves axially away from inlet port 508 and moves spool valve 526 against spring 538. The spool valve 526 is constructed to move a sufficient distance to close the passageway 522 at 524 and open passageway 518 at 520. In this position the chamber 462 behind valve 468 is open to the same fluid pressure as chamber 462 in front of valve 468. The front portion of chamber 462 communicates with the portion of the chamber 462 behind valve 468 through passageway 518, bore 514 and passageway 540. As previously stated, passageway 522 is closed by the spool enlarged portion 528. With this arrangement when the operator depresses pedal 440 both piston 498 and piston 542 move in a direction to compress respective springs 470 and 538. Through the movement of spool 526 against spring 538 the rear wall 467 of the valve 468 is subjected to a fluid pressure to provide a balancing pressure for the valve 468. With this arrangement, the operator does not oppose, through pedal 440, the full braking pressure created in valve 406.

The pilot valve 526 serves also as a positive means to release the valve 468 from its throttling position over outlet passageway 466 when the operator releases pressure on pedal 440. The spool 526 is operator actuated in that the pedal 440 provides pressure to conduit 454 which moves the spool against the force of spring 538 to connect the pressure port at 520 to passageway 540. When the operator releases the pressure in conduit 454 the spring 538 moves the spool to connect outlet port 412 to passageway 540 so that the pressure behind the cup shaped valve 468 is vented. This relieves the balancing pressure on the valve 468 so that the spring 470 and the fluid pressure in chamber 462 moves valve 468 to the full open position.

*Operation—Embodiment III*

With the foregoing details of construction and arrangement in mind, the operation of the braking apparatus illustrated in FIGURES 3–5 will be considered. The braking apparatus may be considered as installed on a powered vehicle having a conventional drive system. The drive shaft 350 of pump 352 is connected to the drive train of the vehicle so that shaft 350 rotates at a speed proportional to the speed of the vehicle.

The vehicle will be considered in motion and the braking apparatus will be first considered in its unactuated condition.

In the unactuated condition, the pump end walls 366 and 368 are spaced from the side walls of gears 356, 358 and 360. The pump shaft 350 is rotating at a speed proportional to that of the speed of the vehicle and the gears within the pump 352 are rotating. Because the pump end walls 366 and 368 are spaced from the gears, fluid is not being circulated from inlet portion 398 to outlet port 400.

When the operator actuates the braking apparatus the first movement of the brake pedal 440 actuates the master cylinder 442 to provide pressurized fluid in conduit 448. Through branch conduits 450, 454 the pressurized fluid is delivered to the modulator valve 406. The same pressurized fluid is delivered through conduit 452 to cylinder 378 within the pump housing 354. The pressurized fluid within cylinder 378 moves piston 376 and bracket 372 to urge end wall 368 against the side walls of gears 356, 358 and 360. This initial movement of end wall 368 is sufficient to energize the pump so that the pump begins to circulate fluid from inlet port 398 to outlet port 400. The fluid is conducted to the modulating valve 406 through conduit 402. Depending upon the amount of braking force desired by the operator, the valve 468 is moved against spring 470 by means of push rod 484 to partially close the outlet passageway 466.

The movement of valve 468 restricts the circulation of fluid through the valve 406 and increases the fluid pressure in conduit 402 between pump 352 and valve 406. The increase in fluid pressure and the restriction of circulation of fluid by the gears of pump 352 opposes the rotation of shaft 350 and provides a braking force for the vehicle. In this manner the positive displacement pump 352 serves as an auxiliary braking apparatus for the vehicle.

As soon as there is a pressure build up in chamber 462 of valve 406, the fluid, under the same pressure, is conducted to cylinders 384, 386 and 392 through passageways 401 to urge pistons 380, 382, 388 and 390 against the brackets 372 and 374. Thus the end plates 366 and 368 are urged into sealing relation with the gear side walls with the same pressure as that in valve chamber 462. With this arrangement the pump 352 continues to circulate fluid through the conduits while the valve member 468 throttles the flow of fluid through outlet passageway 466.

A portion of the pressurized fluid flows from valve chamber 462 through passageway 478 to outlet port 414. The pressurized fluid is utilized to drive hydraulic motor 418 which in turn drives fan 420. Thus the motor 418 is only driven when the auxiliary brake is actuated because only pressurized fluid generated by brake actuation is utilized to drive the motor 418.

The fluid leaving valve 406 through outlet port 408 is distributed to tank 396, reservoir 426 and heat exchanger 434. The size of conduits 428, 430 and 432 may be suitably proportioned so that approximately 37 percent of the fluid is conducted to tank 396, 37 percent conducted to reservoir 426 and 25 percent to the heat exchanger. Depending on the frequency of use of the auxiliary brakes, the volume of fluid conducted to the heat exchanger may be altered by changing the conduit sizes so that either a greater or lesser amount of fluid is circulated to the heat exchanger 434.

The springs within valve 406 are so proportioned that at a predetermined pressure the valve member 468 will move the push rod 484 against spring 496 so that push rod 484 will move axially relative to member 488 and piston 498. Thus the valve member 406 may be constructed to limit the pressure within the conduit 492 to a preselected pressure such as 2,000 p.s.i.

When the operator releases the pressure in cylinder 442 the valve member 462 moves to a full open position and relieves all pressure in conduit 402 which through passageways 401 in pump housing 352 releases the pressure in cylinders 384, 386, 392 and 394. At the same time, pressure in cylinder 378 is released so that the pump end walls 366 and 368 move away from the gears 356, 358 and 360. In this position the gears rotate within the pump housing but do not unnecessarily circulate fluid in the circuit. With this arrangement our auxiliary braking apparatus in a brake disengaged position requires only enough energy from the vehicle to idle three gears in a lubricant bath. When engaged, our braking apparatus is operable to exert a positive braking force on the vehicle, which braking force is instantly relieved when the operator releases the brake pedal.

It should be understood that although our invention has been described as utilizing a three gear positive displacement pump, other positive displacement pumps having movable end walls can be used with equal facility.

According to the provisions of the patent statutes, we have explained the principle, preferred construction and mode of operation of our invention and have illustrated and described what we now consider to represent its best embodiments. However, we desire to have it understood that, within the scope of the appended claims, the invention may be practiced otherwise than as specifically illustrated and described.

We claim:

1. Auxiliary braking apparatus for a driver controlled vehicle having a plurality of wheels and a conventional braking system for the wheels including, first control means to actuate said auxiliary braking apparatus and second control means to actuate said conventional braking system, said auxiliary braking apparatus comprising a normally unactuated kinetic absorption means comprising a continuous fluid circuit, a pump in said circuit arranged to circulate fluid around said circuit, said pump having a drive shaft, connecting means between said pump drive shaft and said rotating shaft, fluid operated disengaging means to render said pump inoperative to circulate fluid through said circuit while said shaft is rotating, resistance means in said circuit to increase the resistance to rotation of said pump drive shaft and thereby exert a retarding force on said rotating shaft, said first control means operable to engage said fluid operated disengaging means so that said pump circulates fluid through said circuit and operable to actuate said resistance means to thereby exert a retarding force on said rotating shaft, and a manually controlled actuator connected to both said first control means and said second control means, said manually controlled actuator operable in a first position to actuate only said auxiliary braking apparatus and in a second position to actuate both said auxiliary braking apparatus and said conventional braking system.

2. Auxiliary braking apparatus for a driver controlled vehicle having a plurality of wheels, and a conventional braking system for said wheels including a control means to actuate said conventional braking system, said auxiliary braking apparatus comprising a normally unactuated kinetic absorption means including a fixed housing portion and a rotatable portion actuatable to rotate relative to said fixed housing portion, said kinetic absorption means adapted to absorb kinetic energy generated by the motion of said vehicle when said rotatable portion is actuated to rotate relative to said housing portion, said rotatable portion and said housing portion being at rest when said rotatable portion is not actuated, drive means including a clutch connecting said rotatable portion to at least one of said vehicle wheels, said clutch having a driving portion and a driven portion, said clutch driving portion operatively connected to at least one of said wheels to be driven at a speed proportional to said vehicle speed, said clutch driven portion non-rotatably secured to said kinetic absorption means rotatable portion, an auxiliary control means operable to actuate said clutch so that said kinetic absorption means rotatable portion rotates at a speed proportional to said vehicle speed, and a manually controlled actuator connected to both said first control means and said second control means, said manually controlled actuator operable in a first position to actuate only said auxiliary braking apparatus and in a second position to actuate both said auxiliary braking apparatus and said conventional braking system.

3. The combination of claim 2 wherein said kinetic absorption means fixed housing portion and rotatable portion together form a combination liquid cooled multiple disc brake and centrifugal pump unit that is operable to pump fluid in a hydraulic circuit which serves to dissipate heat generated by said kinetic absorption means when said kinetic absorption means is actuated.

4. Auxiliary braking apparatus for a driver controlled powered vehicle having a plurality of wheels, and a conventional braking system for said wheels including a first control means to actuate said conventional braking system, said auxiliary braking apparatus comprising a fluid circuit including rotary pump means for partially dissipating the kinetic energy generated by the motion of said vehicle, said rotary pump means having an impeller and a housing, said impeller being actuatable to rotate relative to said housing to circulate fluid through said circuit upon rotation of said impeller, drive means including a clutch drivingly connecting said pump means to said vehicle wheels, said clutch having a driving portion and a driven portion, said clutch driving portion operatively connected with said wheels to be driven at a speed proportional to said vehicle speed, said clutch driven portion nonrotatably secured to said rotary pump means impeller, an auxiliary control means to actuate said clutch so that said rotary pump means impeller is driven at a speed proportional to said vehicle speed, and a manually controlled actuator connected to both said first control means and said auxiliary control means, said manually controlled actuator operable in a first position to actuate only said auxiliary braking apparatus and in a second position to actuate both said auxiliary braking apparatus and said conventional braking system.

5. Braking apparatus for a powered vehicle having a prime mover, a plurality of wheels including driven wheels, and drive means for transmitting power from said prime mover to said driven wheels, said braking apparatus comprising a continuous hydraulic circuit, a positive displacement pump in said circuit having a rotatable impeller and a fixed housing operable to pump fluid through said circuit, variable resistance means in said hydraulic circuit operable to increase the pressure in a portion of said circuit to thereby increase the resistance to rotation exerted on said pump impeller, a fluid reservoir to maintain fluid in said circuit, a dump valve in said hydraulic circuit having a pressure inlet port adapted to receive pressurized fluid from said pump, a first outlet port communicating with said variable resistance means, a second outlet port, a third outlet port communicating with said fluid reservoir, a dump valve control means operable to selectively connect said pressure inlet port simultaneously with said first and second outlet ports, pump drive means including a fluid actuated clutch connecting said pump to said vehicle wheels, said fluid actuated clutch having a driving portion and a driven portion, said clutch having first and second fluid actuating chambers constructed to cause engagement of said clutch driving portion with said clutch driven portion when either of said chambers is supplied with pressurized fluid, said clutch driving portion operatively connected to at least one of said vehicle wheels for rotation at a speed proportional to said vehicle speed, said clutch driven portion nonrotatably secured to said pump impeller, master cylinder means actuatable to generate fluid pressure in said clutch first actuating chamber, conduit means connecting said clutch second actuating chamber to said dump valve second outlet port for fluid communication therewith, and master control means operable to actuate said braking apparatus by actuating in sequence said master cylinder means to drivingly connect said pump impeller to at least one of said vehicle wheels through said clutch, said dump valve control means to connect said dump valve pressure inlet port with said dump valve first and second outlet ports, and said variable resistance means to increase the pressure in said hydraulic circuit been said variable resistance means and said pump to thereby increase the resistance to rotation exerted on said pump impeller, said hydraulic circuit increased pressure causing an increased pressure to be conducted to said clutch second actuating chamber to more forcefully engage said clutch, and said increased resistance to rotation exerted on said pump impeller exerting a braking force on said vehicle.

6. Auxiliary braking apparatus for a driver controlled powered vehicle having a prime mover, a plurality of wheels including driven wheels, a conventional braking system having a driver operated control means to actuate said conventional braking system, and a drive means for transmitting power from said prime mover to said driven wheels, said auxiliary braking apparatus comprising a continuous hydraulic circuit, a positive displacement pump in said circuit having a rotatable impeller and a fixed housing operable to pump fluid through said hydraulic circuit, variable resistance means in said hydraulic circuit operable to increase the pressure in a portion of said circuit to thereby increase the resistance to rotation exerted on said pump impeller, a fluid reservoir to maintain fluid in said circuit, a dump valve in said hydraulic circuit having a pressure inlet port adapted to receive pressurized fluid from said pump, a first outlet port communicating with said variable resistance means, a second outlet port, a third outlet port communicating with said fluid reservoir and a dump valve control means operable to selectively connect said pressure inlet port simultaneously with said first and second outlet ports, pump drive means including a fluid actuated clutch connecting said pump to said vehicle wheels, said fluid actuated clutch having a driving portion and a driven portion, said clutch having first and second fluid actuating chambers constructed to cause engagement of said clutch driving portion with said clutch driven portion when either of said chambers is supplied with pressurized fluid, said clutch driving portion operatively connected to at least one of said vehicle wheels for rotation at a speed proportional to said vehicle speed, said clutch driven portion nonrotatably secured to said pump impeller, master cylinder means actuatable to generate fluid pressure in said clutch first actuating chamber, conduit means connecting said clutch second actuating chamber to said dump valve second outlet port for fluid communication therewith, and master control means to actuate said conventional braking system and said auxiliary braking apparatus by actuating in sequence said master cylinder means to drivingly connect said pump impeller to at least one of said vehicle wheels through said clutch, said dump valve control means to connect said dump valve pressure inlet port with said dump valve first and second outlet ports, said variable resistance means to increase the pressure in said hydraulic circuit between said variable resistance means and said pump to thereby increase the resistance to rotation exerted on said pump impeller, and said conventional braking system driver operated control means, said hydraulic circuit increased pressure causing an increased pressure to be conducted to said clutch second actuating chamber to more forcefully engage said clutch, said increased resistance to rotation exerted on said pump impeller exerting an auxiliary braking force on said vehicle, and said master control means causing said auxiliary braking apparatus to be actuated prior to said conventional braking system.

7. Braking apparatus for a powered vehicle having a prime mover, a plurality of wheels including driven wheels, and drive means for transmitting power from said prime mover to said driven wheels, said braking apparatus comprising a continuous hydraulic circuit, a fluid reservoir in said circuit, a combination liquid cooled multiple disc brake and centrifugal pump unit in said circuit operable to pump liquid through said circuit, said combination brake and pump unit having a fixed housing with a plurality of discs nonrotatably secured thereto, a rotatable impeller with a plurality of impeller-brake plates nonrotatably secured thereto and rotatable therewith, and a fluid pressure actuating chamber receiving a piston operable to force said plurality of impeller-brake plates into frictional engagement with said plurality of discs when said chamber is supplied with pressurized liquid, brake and pump unit drive means including a fluid actuated clutch connecting said unit to said vehicle wheels, said fluid actuated clutch having a driving portion and a driven portion, said clutch having a fluid pressure actuating chamber constructed to cause engagement of said clutch driving portion with said clutch driven portion when said clutch chamber is supplied with pressurized fluid, said clutch driving portion operatively connected to at least one of said vehicle wheels for rotation at a speed proportional to said vehicle speed, said clutch driven portion nonrotatably secured to said combination disc brake and centrifugal pump unit impeller, master cylinder means actuatable to generate fluid pressure in said combination disc brake and pump unit actuating chamber to exert a braking force on said impeller, a source of pressurized fluid, fluid conducting means actuatable to selectively conduct said pressurized fluid to said clutch actuating chamber to thereby engage said clutch driving portion with said clutch driven portion, and master control means operable to actuate said braking apparatus by actuating said fluid conducting means to drivingly connect said combination brake and pump unit impeller to at least one of said vehicle wheels by engaging said clutch, and by actuating said master cylinder means to exert a braking force upon said impeller.

8. Auxiliary braking apparatus for a driver controlled powered vehicle having a prime mover, a plurality of wheels including driven wheels, a conventional braking system having a driver operated control means to actuate said conventional braking system, and drive means for transmitting power from said prime mover to said driven wheels, said auxiliary braking apparatus comprising a continuous hydraulic circuit, a fluid reservoir in said circuit, a combination liquid cooled multiple disc brake and centrifugal pump unit in said circuit operable to pump liquid through said circuit, said combination brake and pump unit having a fixed housing with a plurality of discs nonrotatably secured thereto, a rotatable impeller with a plurality of impeller-brake plates nonrotatably secured thereto and rotatable therewith, and a fluid pressure actuating chamber receiving a piston operable to force said plurality of discs and said plurality of impeller-brake plates into frictional engagement with each other when said chamber is supplied with pressurized liquid, brake and pump unit drive means including a fluid actuated clutch connecting said unit to said vehicle wheels, said fluid actuated clutch having a driving portion and a driven portion, said clutch having a fluid pressure actuating chamber constructed to cause engagement of said clutch driving portion with said clutch driven portion when said clutch chamber is supplied with pressurized fluid, said clutch driving portion operatively connected to at least one of said vehicle wheels for rotation at a speed proportional to said vehicle speed, said clutch driven portion nonrotatably secured to said combination disc brake and centrifugal pump unit impeller, master cylinder means actuatable to generate fluid pressure in said combination disc brake and pump unit actuating chamber to exert a braking force on said impeller, a source of pressurized fluid, fluid conducting means actuatable to selectively conduct said pressurized fluid to said clutch actuating chamber to thereby engage said clutch driving portion with said clutch driven portion, and master control means to actuate said conventional braking system and said auxiliary braking apparatus by actuating said fluid conducting means to drivingly connect said combination brake and pump impeller to at least one of said vehicle wheels by engaging said clutch and said master cylinder means to exert a braking force upon said impeller, and said conventional braking system driver operated control means to actuate said conventional braking system after said auxiliary braking apparatus has been actuated.

9. Braking apparatus for a powered vehicle having a prime mover, a plurality of wheels including driven wheels, and drive means for transmitting power from said prime mover to said driven wheels, said braking apparatus comprising a continuous hydraulic circuit, a fluid reservoir in said circuit, a combination liquid cooled multiple disc brake and centrifugal pump unit in said circuit operable to pump liquid through said circuit, said combination brake and pump unit having a fixed housing with a plurality of discs nonrotatably secured thereto, a rotatable impeller with a plurality of impeller-brake plates nonrotatably secured thereto and rotatable therewith, and a fluid pressure actuating chamber receiving a piston operable to force said plurality of impeller brake plates into frictional engagement with said plurality of discs when said chamber is supplied with pressurized liquid, brake and pump unit drive means including a fluid actuated clutch connecting said unit to said vehicle wheels, said fluid actuated clutch having driving portion and a driven portion, said clutch having a fluid pressure actuating chamber constructed to cause engagement of said clutch driving portion with said clutch driven portion when said clutch chamber is supplied with pressurized fluid, said clutch driving portion operatively connected to at least one of said vehicle wheels for rotation at a speed proportional to said vehicle speed, said clutch driven portion nonrotatably secured to said combination disc brake and centrifugal pump unit impeller, master cylinder means actuatable to generate fluid pressure in said combination disc brake and pump unit actuating chamber to exert a braking force on said impeller and to generate fluid pressure in said clutch actuating chamber to thereby engage said clutch driving portion with said clutch driven portion, and master control means operable to actuate said braking apparatus by actuating said master cylinder means.

10. Braking apparatus for retarding the rotation of a rotating shaft, said braking apparatus comprising a normally unactuated kinetic absorption means for absorbing kinetic energy generated by the rotation of said shaft when said kinetic absorption means is actuated, said kinetic absorption means including a continuous fluid circuit, a positive displacement pump to circulate fluid through said circuit, said pump having a drive shaft, connecting means between said pump drive shaft and said rotating shaft, fluid operated disengaging means to render said positive displacement pump inoperative to circulate fluid through said circuit while said first named shaft is rotating, resistance means in said circuit operable to increase the fluid pressure in a portion of said circuit and thereby increase the resistance to rotation of said pump and exert a retarding force on said rotating shaft, driver operated control means to engage said fluid operated disengaging means so that said pump circulates fluid through said circuit, and conduit means connecting said portion of said continuous circuit and said fluid pressure operated disengaging means to thereby engage said fluid operated disengaging means with a force proportional to the pressure of said fluid in said portion of said continuous circuit.

11. Braking apparatus as set forth in claim 10 which includes means to vent said conduit means simultaneously with the disengagement of said driver operated control means.

12. Braking apparatus for a vehicle having a plurality of wheels, said braking apparatus comprising a normally unactuated kinetic absorption means for absorbing kinetic energy generated by the motion of said vehicle when said kinetic absorption means is actuated, said kinetic absorption means including a continuous fluid circuit, a positive displacement pump to pump fluid through said circuit, and resistance means in said circuit operable to increase resistance to rotation exerted upon said positive displacement pump and to increase fluid pressure in a portion of said circuit, drive means including fluid actuated disengaging means for operatively connecting said positive displacement pump to at least one of said vehicle wheels to thereby actuate said kinetic absorption means, and conduit means connecting said portion of said continuous fluid circuit and said fluid actuated disengaging means, said fluid actuated disengaging means being at least partially actuated by pressurized fluid from said portion of said continuous circuit when said resistance means is operated to increase the resistance to rotation exerted upon said positive displacement pump, said pressurized fluid from said portion of said continuous circuit causing said disengaging means to be more forcefully engaged due to the increased pressure of said pressurized fluid from said portion of said continuous fluid circuit communicating with said fluid actuated disengaging means through said conduit means and exerting a pressure on said fluid actuated disengaging means proportional to the pressure of said fluid in said portion of said continuous circuit.

13. Braking apparatus for retarding the rotation of a rotating shaft, said braking apparatus comprising a normally unactuated kinetic absorption means for absorbing kinetic energy generated by a the rotation of said shaft when said kinetic absorption means is actuated, said kinetic absorption means including a continuous fluid circuit, a positive displacement pump to circulate fluid through said circuit, said pump having a drive shaft, connecting means between said pump drive shaft and said rotating shaft, fluid operated disengaging means to render said positive displacement pump inoperative to circulate fluid through said circuit while said first named shaft is rotating, a fluid reservoir to maintain fluid in said circuit, valve means in said circuit operable to increase the pressure of said fluid in a portion of said circuit and thereby increase the resistance to rotation of said pump, and second fluid actuated control means to engage said fluid operated disengaging means with a force proportional to the pressure of said fluid in said portion of said continuous circuit.

14. Braking apparatus for retarding the rotation of a rotating shaft, said braking apparatus comprising a positive displacement pump having an inlet and an outlet, said positive displacement pump having a rotatable impeller connected to said rotating shaft for rotation therewith and a housing having a movable wall adjacent to said impeller, said pump operable when said movable wall is urged against said impeller to circulate fluid from said inlet to said outlet, said positive displacement pump being inoperative to circulate fluid through said circuit when said movable wall is spaced from said impeller, a tank connecting said pump inlet, a modulating valve having an inlet port, an outlet port, and a control port, a hydraulic motor, fluid pressure operated means to move said pump housing side wall against said impeller, conduit means connecting said pump outlet to said hydraulic motor, said valve inlet port, and said fluid pressure actuated means, a heat exchanger, a fluid reservoir, second conduit means connecting said valve outlet port and said heat exchanger, fluid reservoir and said tank, a manually controlled fluid pressure generating means, third conduit means connecting said manually controlled fluid pressure generating means to said fluid pressure operated means and to said valve control port, said manually controlled fluid pressure generating means operable to actuate said fluid pressure operated means so that said pump circulates fluid therethrough and actuates said valve means to modulate the flow of fluid through said valve outlet and thereby increase the pressure in said first conduit means and increase the resistance to rotation of said pump impeller.

15. A modulator valve comprising a housing having a chamber, an inlet port, and an outlet port, said chamber having a passageway communicating with said inlet port and an annular passageway communicating with said outlet port, a valve member slidably positioned in said chamber and movable axially into a valve closed position whereby said valve member is in overlying relation with said annular passageway to thereby close said valve outlet port, spring means in said chamber urging said valve member away from said second annular passageway, said housing having a longitudinal bore, a control port communicating with said bore, a piston movable axially in said bore, a rod positioned in said bore and having one end abutting said valve member and the other end connected to said piston so that movement of said piston toward said valve member moves said valve member toward a closed position, and pressure actuated means to move said rod axially relative to said piston above a predetermined pressure in said chamber to thereby open said valve member above a predetermined fluid pressure in said chamber.

16. a modulating valve as set forth in claim 15 in which said housing has a second bore with a shuttle valve slidably positioned therein, a second passageway connecting said first passageway with said second bore to conduct pressurized fluid from said chamber to said bore, a third passageway connecting said second bore to said chamber on the opposite side of said valve member as said outlet port, a fourth passageway connecting said second bore and a second outlet port, said shuttle valve arranged to alternatively connect said third passageway with said second passageway to thereby subject said valve member opposite side to pressurized fluid from said chamber or connect said third passageway with said fourth passageway and vent the pressurized fluid from said chamber behind said valve member, spring means urging said shuttle valve to a vent position, and fluid pressure actuated means to move said shuttle valve against the force of said spring means to a pressure position.

References Cited in the file of this patent

UNITED STATES PATENTS

| | | | |
|---|---|---|---|
| 1,348,604 | Titus | Aug. 3, | 1920 |
| 1,694,020 | Price | Dec. 4, | 1928 |
| 1,735,529 | Dey | Nov. 12, | 1929 |
| 1,756,904 | Jack | Apr. 29, | 1930 |
| 1,987,273 | Strigl | Jan. 8, | 1935 |
| 2,047,587 | Laramore | July 14, | 1936 |
| 2,241,189 | Dick | May 6, | 1941 |
| 2,413,162 | Ackerman | Dec. 24, | 1946 |
| 2,782,878 | Hancock | Feb. 26, | 1957 |
| 2,786,553 | Boone et al. | Mar. 26, | 1957 |
| 2,842,231 | Pepper | July 8, | 1958 |
| 2,933,158 | Pitts | Apr. 19, | 1960 |
| 2,963,117 | McGill | Dec. 6, | 1960 |
| 3,018,979 | Parks | Jan. 30, | 1962 |